(12) United States Patent
Neugebauer

(10) Patent No.: US 7,855,975 B2
(45) Date of Patent: Dec. 21, 2010

(54) RESPONSE TIME ESTIMATION FOR INTERMITTENTLY-AVAILABLE NODES

(75) Inventor: Mario Neugebauer, Dresden (DE)

(73) Assignee: SAP AG, Walldorf (DE)

( * ) Notice: Subject to any disclaimer, the term of this patent is extended or adjusted under 35 U.S.C. 154(b) by 728 days.

(21) Appl. No.: 11/807,695

(22) Filed: May 30, 2007

(65) Prior Publication Data

US 2008/0298235 A1    Dec. 4, 2008

(51) Int. Cl.
G01R 31/08    (2006.01)
G06F 15/16    (2006.01)
H04W 4/00    (2009.01)

(52) U.S. Cl. .................. 370/252; 370/230; 370/248; 709/228; 455/426.2

(58) Field of Classification Search ......... 370/229–230, 370/235, 236, 248–249, 252, 328, 338, 389, 370/392, 395.4, 465, 470–472; 709/225, 709/227, 228; 455/41.2, 426.2; 714/25
See application file for complete search history.

(56) References Cited

U.S. PATENT DOCUMENTS

| | | | |
|---|---|---|---|
| 5,870,605 A | 2/1999 | Bracho et al. | |
| 6,192,404 B1 * | 2/2001 | Hurst et al. | 709/224 |
| 6,772,203 B1 * | 8/2004 | Feiertag et al. | 709/219 |
| 6,959,333 B2 | 10/2005 | Beaumont et al. | |
| 6,961,568 B2 * | 11/2005 | Sugaya | 455/435.1 |
| 6,963,914 B1 * | 11/2005 | Breitbart et al. | 709/226 |
| 6,985,476 B1 | 1/2006 | Elliott et al. | |
| 7,483,943 B2 * | 1/2009 | Kakivaya et al. | 709/203 |
| 2001/0034752 A1 * | 10/2001 | Kremien | 709/105 |
| 2005/0058081 A1 * | 3/2005 | Elliott | 370/252 |
| 2005/0243733 A1 * | 11/2005 | Crawford et al. | 370/252 |
| 2006/0230134 A1 * | 10/2006 | Qian et al. | 709/224 |
| 2007/0101019 A1 * | 5/2007 | Cromer et al. | 709/238 |
| 2007/0232230 A1 * | 10/2007 | Anke et al. | 455/39 |
| 2007/0268911 A1 * | 11/2007 | Alve | 370/395.52 |
| 2008/0148360 A1 * | 6/2008 | Karstens | 726/4 |
| 2008/0205292 A1 * | 8/2008 | Denby et al. | 370/254 |

* cited by examiner

Primary Examiner—Aung S Moe
Assistant Examiner—Redentor M Pasia
(74) Attorney, Agent, or Firm—Brake Hughes Bellermann LLP

(57) ABSTRACT

Message exchanges may be executed between a middleware component and at least one intermittently-available node, during connected phases of the intermittently available node with the middleware component. Transmission parameters associated with the message exchanges may be monitored, and a current request message to be sent to the intermittently-available node may be determined, the current request message being associated with a time-to-live. An expected message exchange time of the current request message and a resulting response message received from the node in response thereto may be determined, relative to the connected phases and based on at least some of the transmission parameters. Based on the expected message exchange time, it may be predicted whether the current request message and the resulting response message will be successfully exchanged with the intermittently-available node, prior to an expiration of the time-to-live of the current request message.

14 Claims, 7 Drawing Sheets

RESPONSE TIME ESTIMATION FOR INTERMITTENTLY-AVAILABLE NODES

TECHNICAL FIELD

This description relates to message transmissions to and from intermittently-available nodes.

BACKGROUND

Many instances exist of message-based exchanges of information between systems and/or devices. For example, operations of certain software applications may require, or may benefit from, access to data, functionality, or other information that is external to the software applications. The software applications may gain access to some such information through the use of message exchanges with hardware and/or software components, referred to generally as nodes, that are designed to provide such information. More specifically, for example, it may occur that the software applications are highly specialized to perform their particular functionalities, and may not be designed or optimized to execute message exchanges with the nodes providing the desired information. Consequently, messaging or other middleware components may be used to facilitate message exchanges between the software applications and the nodes.

In practice, it may occur that some of these nodes are only intermittently-available to the middleware component(s). For example, some such nodes may be mobile, such as when a node includes, or is associated with, a vehicle (such as, for example, a truck or a car). Other mobile nodes may include mobile computing devices (such as, for example, mobile phones or personal digital assistants), or persons who are equipped with various types of computing equipment. Other nodes may be stationary, but may be intermittently available by virtue of periodically reducing or deactivating a power source used for data transmission.

Thus, such intermittently-available nodes may experience connected phases (e.g., when they are in range or otherwise in communication with a middleware component), and non-connected phases (e.g., when communication with the middleware component is unavailable). In practice, such intermittent availability may result in an inability of the middleware component to exchange one or more messages with the node(s) at any particular time, such as during a non-connected phase. Consequently, an operator of the software application(s) and the middleware component may not be aware, with sufficient specificity, of whether and when a particular message exchange can or will occur.

In such situations, a time-to-live (TTL) may be associated with a message to be sent to the node, so that if the message resides in the middleware component for an amount of time equal to or greater than the time-to-live, then the message may expire and an error may be provided to the operator. Such a solution provides certain advantages, such as, for example, avoiding circumstances where messages grow stale or outdated within the middleware component. However, such a solution, by itself, does not actually provide the operator with sufficient information as to whether and when a successful message exchange may occur, but, rather, merely provides information as to a time after which the message exchange may not occur (at least, without further action). Moreover, to obtain even this information regarding the non-occurrence of the desired message exchange, the operator may be required to wait an entirety of the time-to-live of the message in question.

In so doing, an efficiency of the software application(s) and middleware component may be reduced. For example, the middleware component may become clogged with messages which have no realistic chance of being delivered before their times-to-live expire, yet the middleware component may nonetheless wait the entirety of the time-to-live for each such message before discarding the message(s). As another example, without knowledge of when the intermittently-available node will be available for delivery of a particular message, it may be difficult for the operator to optimize scheduling of desired message exchanges.

SUMMARY

According to one general aspect, a response time estimator system includes a parameter monitor configured to monitor transmission parameters associated with message exchanges between a middleware component and at least one intermittently-available node, the intermittently-available node experiencing connected phases and non-connected phases with the middleware component. The system further includes an expectation manager configured to determine a current request message at a queue of the middleware component, and configured to determine an expected message exchange time for the current request message and a resulting response message, based on a number of preceding request messages within the queue and on corresponding response messages from the intermittently-available node, and based on at least some of the transmission parameters. The system further includes a result predictor configured to perform a comparison of the expected message exchange time and a time-to-live of the request message, and configured to predict, based on the comparison, whether a receipt of the resulting response message will occur, within one of the connected phases and before expiration of the time-to-live.

According to another general aspect, message exchanges are executed between a middleware component and at least one intermittently-available node, during connected phases of the intermittently available node with the middleware component. Transmission parameters associated with the message exchanges are monitored, and a current request message to be sent to the intermittently-available node is determined, the current request message being associated with a time-to-live. An expected message exchange time of the current request message and a resulting response message received from the node in response thereto is determined, relative to the connected phases and based on at least some of the transmission parameters. Based on the expected message exchange time, it is predicted whether the current request message and the resulting response message will be successfully exchanged with the intermittently-available node, prior to an expiration of the time-to-live of the current request message.

According to another general aspect, a message exchange system includes a queue configured to execute message exchanges with at least one intermittently-available node, during connected phases of the intermittently available node. The system further includes a message handler configured to forward request messages from the queue to the intermittently-available node, based in part on a time-to-live associated with each message, and configured to receive resulting response messages received from the intermittently-available node. The system further includes a response time estimator configured to make a comparison of the time-to live of a current request message in the queue with an expected message exchange time of the current request message and a resulting response message from the intermittently-available node, and configured to predict a result of a future exchange of the current request message with the resulting response message.

The details of one or more implementations are set forth in the accompanying drawings and the description below. Other features will be apparent from the description and drawings, and from the claims.

DETAILED DESCRIPTION

Figure 1:
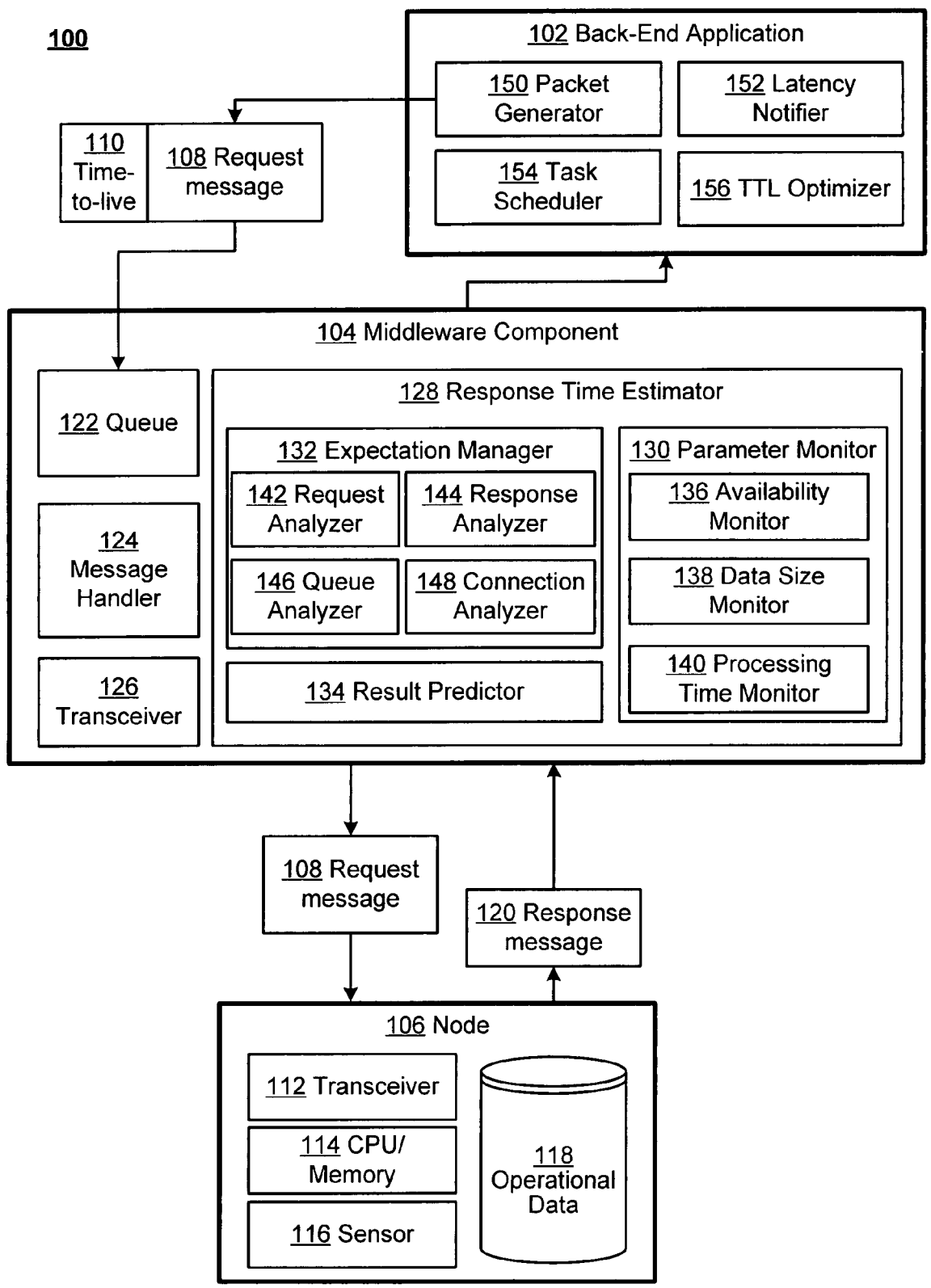
FIG. 1 is a block diagram of a system for response time estimation for intermittently-available nodes.

FIG. 1 is a block diagram of a system 100 for response time estimation for intermittently-available nodes. By virtue of such response time estimation, e.g., estimation of whether and when an intermittently-available node will respond to a current message to be sent, an efficiency of messaging operations may be increased. For example, messages which have no realistic chance of being delivered prior to their expiration may be removed immediately, without waiting for the actual expiration to occur (so that appropriate action, such as notification of an operator of the failure, or re-scheduling of the message transmission (perhaps with a longer expiration time) may occur). Similarly, the ability to predict whether and when an intermittently-available node will be available may allow for the realistic and efficient scheduling of messaging tasks.

In the example of FIG. 1, a back-end application 102 may refer, as referenced above, to a software application that is designed to perform some particular functionality. For example, the back-end application 102 may include, or be associated with, business-related application(s), such as, for example, inventory management systems, supply chain management systems, retail store management systems, warehouse management systems, product life cycle management systems, and any other system(s) that may be used to execute business processes with respect to real-world objects. In some examples, such real-world objects may include, for example, products for sale, pallets or other shipment elements, patients, or manufacturing materials/equipment. Thus, the back-end application 102 may be used, for example, to determine inventory levels, set pricing levels, evaluate marketing strategies, evaluate manufacturing or production technologies, reduce theft, determine asset conditions, or maintain safety.

As referenced herein, many other examples of the back-end application 102 exist, inside or outside of the business context, including, for example, systems designed to control physical values in an environment (e.g., in a building). Examples of such physical values may include temperature, humidity, and luminosity. Thus, the back-end application 102 should be interpreted broadly as including virtually any application that may be used in profit generation of some sort, as well as virtually any application associated with non-profit endeavors, including, for example, schools, churches, charities, hospitals, or virtually any other person or organization.

During operation, the back-end application 102 may require external data, functionality, or other information, and may gain such information by way of a middleware component 104. That is, for a variety of reasons, the back-end application 102 may not be designed or optimized for executing message exchanges associated with obtaining such external information. For example, the back-end application 102 may be a legacy application of an enterprise, and may not have been designed for such message exchanges. In other examples, it may be more efficient to allow the middleware component 104 to specialize in conducting messaging, in order to optimize the messaging functionality in a manner that is common to multiple ones (or multiple types) of the back-end application 102, and without having to integrate messaging functionality directly into the back-end application.

Similarly, the middleware component 104 may be optimized to interact with a plurality of different types of nodes, represented in FIG. 1 by an intermittently-available node 106. For example, and similarly with respect to the back-end application 102, the middleware component 104 may be configured to implement the necessary protocols and interfaces to communicate with various types of the node 106, e.g., Bluetooth or WiFi, as is known.

Thus, the back-end application 102 may generate a request message 108 for communication thereof to the node 106 by the middleware component 104, as shown. The request message 108 may request, for example, specific data that is stored on the node 106, and that may be useful to the back-end application 102.

As referenced herein, the node 106 may be only intermittently available for connection to the middleware component 104. For example, the node 106 may be mobile, and may intermittently move out of a transmission range of the middleware component 104. For example, if the back-end application 102 includes a supply chain management or inventory management application, then the node 106 may include, or be associated with, a truck or other transportation vehicle that transports inventory. Thus, the back-end application 102 may use the message 108 and the middleware component 104 to obtain information from the truck (such as an amount of inventory contained therein, or a number of miles traveled by the truck). In other examples, the node 106 may make itself temporarily or intermittently unavailable as part of a power-saving operation.

Consequently, a time-to-live (TTL) 110 may be associated with the request message 108. The request message 108 is thus designed to expire, or to be expired or expunged, after the time-to-live 110 has elapsed. In this way, as referenced, the request message 108 is essentially assured of not becoming stale, outdated, or otherwise clogging, disrupting, or delaying an operation of the middleware component 104 in delivering other request messages, even if the node 106 is not available for a lengthy time (or if the message 108 is otherwise undeliverable at a time of expiration of the time-to-live 110).

In FIG. 1, the node 106 may represent, or be referred to as, for example, a "smart item," "smart device," "smart item device," "mote," or other similar terms, which may be used similarly or interchangeably in various contexts. For example, any of the terms just referenced, or similar terms, may refer to a device having local processing, storage, and communications capability, as referenced herein, or may refer to a combination of such a device and an object to which the device is affixed (e.g., the object may include a vehicle or a movable pallet containing merchandise for sale).

In the example of FIG. 1, the node 106 may include various known components having known operations, including, for example, a transceiver 112, CPU/memory 114, a sensor 116, and operational data 118. For example, the operational data 118 may represent storage of a radio-frequency identification (RFID) tag storing information detected by the sensor 116, which may include, for example, environmental sensors (e.g., a temperature, pressure, humidity, or vibration sensor).

In a more specific example of FIG. 1, it may occur that the back-end application 102 is a food-safety application designed to ensure a safety of transported food products, such as meats or produce. For example, certain food products may be required not to exceed a certain temperature for a certain amount of time during transportation thereof. Therefore, a truck transporting the food products may include the node 106, and the sensor 116 may be a temperature sensor that periodically writes to the operational data 118 associated with an RFID tag. Then, the back-end application 102 may send the request message 108, requesting the temperature report of the node 106 from the operational data 118.

In an intended operation, the node 106, using the CPU/memory 114 and the transceiver 112, may transmit the temperature report in a response message 120. In practice, the truck (and node 106) may not be available to receive the request message 108, e.g., may experience an extended non-connected phase during which no communication with the middleware component 104 is possible (so that the response message 120 is not requested or delivered), such as when the truck is delayed or re-routed to another shipment facility. In these scenarios, as referenced herein, the request message 108 may reside in a queue 122 of the middleware component up until the time-to-live 110 of the request message 108 is reached, whereupon a message handler 124 may expunge the request message from the queue 122 and may, perhaps in conjunction with a transceiver 126 of the middleware component 104, alert the back-end application 102 as to the delivery failure of the request message 108.

During the time that the request message 108 resides in the queue 122, i.e., waiting for the time-to-live 110 to expire, an operation of the middleware component 104 may be clogged or otherwise delayed or hindered. For example, it may occur that the back-end application 102 desires many other types of information from the truck in the example just given, and may place a corresponding number of request messages into the queue 122. If the truck is delayed, then all of these request messages may be undeliverable, and may fill the queue 122 (to the exclusion of other request messages, from other applications and/or to other nodes) until the time-to-live of each such request message expires. Consequently, the queue 122 may be overrun, or the operation of the middleware component 104 may be forced to halt, until the time-to-live of at least some of the request messages expires and space is again cleared within the queue 122.

To help avoid such situations, and to generally improve an operation and efficiency of the middleware component 104, (and thus of the back-end application 102 and the node 106), the middleware component 104 may be provided with a response time estimator 128. As referenced herein, the response time estimator 128 is configured to tell very quickly after placement of the request message 108 into the queue 122 whether it is likely that the request message 108 will be delivered to the node 106 prior to an expiration of the time-to-live 110.

As a result, appropriate action may be taken. For example, if the back-end application 102 places the request message 108 into the queue 122, the response time estimator 128 may predict quite quickly (e.g., in a time much less than the time-to-live 110) that the time-to-live 110 would not be sufficient to allow for the delivery of the request message 108 to the node 106 (due, for example, either to an expected, lengthy non-connected phase of the node 106, and/or due to a large number of request messages already stored in the queue 122). Consequently, the response time estimator 128 may remove the request message from the queue 122 right away (thus clearing that space in the queue 122), and promptly alert the back-end application 102 as to the delivery failure of the request message 108.

In operation, the response time estimator 128 may take into account a number of factors that may affect a deliverability of the request message 108 (and ultimate receipt of the response message 120 in return). That is, although an availability (or lack of availability) of the node 106 may be an overriding factor in an ability of the middleware component 104 to deliver the request message 108, it will be appreciated that an extent to which the node 106 may be connected to the middleware component 104 (for purposes of delivering the request message 108) may be dependant on a number of factors. For example, even if the node 106 experiences relatively long connected phases to the middleware component 104, it may occur that there are a large number of preceding request messages in the queue 122, or that the request message 108 (and/or the response message 120) is/are very large, or that a transmission speed between the middleware component 104 and the node 106 is slow, so that, for these and similar circumstances, even relatively long or frequent connected phases of the node 106 may be insufficient to allow complete transmission of the request message 108 and the response message 120, prior to the expiration of the time-to-live 110.

Moreover, many or all of the above parameters, and other parameters not specifically mentioned, may not be known or derivable at a design-time of the system 100. Instead, such parameters may not be known until a run-time of the system 100, and, further, the parameters may change over time, during run-time.

Thus, in order to have knowledge of the relevant, desired parameters, a parameter monitor 130 may be used that is configured to monitor various transmission parameters associated with the message exchanges between the middleware component 104 and the intermittently-available node 106. By virtue of the monitoring and recording of such transmission parameters, as described in more detail, below, an expectation manager 132 may be provided with information (i.e., including the transmission parameters) to determine an expected message exchange time for the message exchange of the request message 108 and the response message 120. For example, the expectation manager 132 may determine certain expectations regarding the (current) request message 108, the (resulting) response message 120, and a nature of the connectivity of the intermittently-available node 106 (e.g., duration and frequency of connected phases).

Then, a result predictor 134 may be configured to analyze the expected message exchange time relative to the time-to-live 110, and relative to the connected phases of the node 106, in order to predict, before an expiration of the time-to-live 110, an ultimate success or failure of the request/response message exchange. The result predictor 134 also may be configured to use the transmission parameters from the parameter monitor 130 to estimate or predict one or more subsequent connected phases of the node 106, e.g., to predict an occurrence and duration of one or more upcoming connected phases of the node 106, so that, for example, scheduling of the transmission of the request message 108 may be performed in an efficient and reliable manner. By estimating a response time for the message exchange of the request message 108 and the response message 120 in this way, the result predictor 134 may provide useful information to other components of the middleware component 104, or to the back-end application 102, so that appropriate action may be taken in response, as described in more detail, below.

In collecting the transmission parameters, the parameter monitor 130, in the example of FIG. 1, may include an availability monitor 136, a data size monitor 138, and a processing time monitor 140. Generally speaking, the availability monitor 136 may be configured to detect parameters related to an availability of the node 106, such as, for example, a time since a beginning of a most-recent connected phase, a time between connected phases, and a duration of connected phases. These and similar parameters may be monitored continuously or sampled discretely, and may be averaged over some period of time or over some number of measurements.

Meanwhile, the data size monitor 138 may be configured to determine, e.g., in bits, an amount of data contained within request messages (such as the request message 108) and response messages (such as the response message 120). Again, such parameters may be measured, averaged, stored, or otherwise manipulated in a desired manner designed to facilitated operation of the expectation manager 132, as described herein.

The processing time monitor 140 may be configured to monitor a time between a transmission of a request message and a receipt of a resulting response message, and thus provides information about a processing time for each request message. As with the availability parameters and the data size parameters, the response time parameters may be averaged and stored, e.g., within appropriate storage of the middleware component 104 (not shown in FIG. 1).

Of course, the parameter monitor 130 may monitor other parameters deemed useful in the response time estimation, and may collect and store individual measurements instead of average measurements, or may perform some other statistical analysis of the collected measurements. The parameter monitor 130 may collect only measurements associated with the specific node 106, or may collect measurements associated with a plurality of such nodes, if the plurality of nodes is considered to be similar enough in collected measurements to be statistically meaningful with respect to the particular transmission parameter (and with respect to the node 106) in question.

The expectation manager 132, upon recognition of an entry of the current request message 108 within the queue 122 by the back-end application 102, may access the stored transmission parameters to calculate expected values associated with delivery of the request message 108 and receipt of the resulting response message 120. For example, a request analyzer 142 may be configured to determine an amount of time until the current request message 108 is received at the node 106, while a response analyzer 144 may be configured to determine an amount of time until the resulting response message is received from the node 106. In both cases, a queue analyzer 146 may be used to determine how many request messages already are stored within the queue 122, since delivery of the current request message 108 (and thus receipt of the resulting response message 120) will be delayed based on this number of request messages. A connection analyzer 148 may be used to determine expected characteristics of connected phases and non-connected phases of the node 106 with the middleware component 104 (such as, e.g., when a current connected phase is expected to end).

It will be appreciated that the expectation manager 132 may have access to other transmission parameters, depending on particular techniques that may be used to calculate the expected values, or other expected values. Such transmission parameters may come from the parameter monitor 130, or, for transmission parameters that vary less in time, or not at all, the expectation manager 132 may have direct access to stored values for such parameters. For example, a bitrate of the connection between the middleware component 104 and the node 106 may be considered to be sufficiently stable to simply be stored as a value within appropriate memory, for use as needed by the expectation manager 132.

Thus, as already described, the result predictor 134 may receive the expected values from the expectation manager 132, may determine the time-to-live 110 from the request message 108, and may determine based on a comparison therebetween whether the message exchange of the current request message 108 and the resulting response message 120 is likely to be executed prior to expiration of the time-to-live 110. Further, the result predictor 134 may predict future information about the connected phases and non-connected phases of the node 106.

If the result predictor 134 predicts a success of the message exchange of the current request message 108 and the resulting response message 120, then no further action need be taken. If, however, the result predictor predicts failure of the message exchange, e.g., that the current request message will not make it out of the queue 122 before the time-to-live 110 expires, then the result predictor 134 may take various corrective or reparative actions.

For example, in the example of FIG. 1, the back-end application 102 is illustrated as including a packet generator 150 that generates the request message 108 and the time-to-live 110. The back-end application 102 also may include a latency notifier 152 that outputs a notification to an operator of longer-than expected latencies in message deliveries of the middleware component 104, a scheduler 154 that may be used to schedule or re-schedule message deliveries, and a time-to-live (TTL) optimizer 156 that may be used to adjust future times-to-live for future request messages. It will be appreciated, then, that operations of the latency notifier 152, the scheduler 154, and the TTL optimizer 156 may be implemented, as least in part, based on outputs of the result predictor 134.

For example, the result predictor 134 may output a result to the message handler 124 that the current request message 108 will not be delivered before expiration of the time-to-live 110. Then, the message handler 124 may remove the message from the queue 122, while the result predictor may report the failure of delivery of the request message 108 to the back-end application 102. In response, the latency notifier 152 may output a notice to an operator of longer-than-expected latencies, since the request message 108 may now have to be re-scheduled, perhaps by the scheduler 154, for later delivery to the node 106. In so doing, the TTL optimizer 156 may increase a magnitude of the time-to-live 110, so as to increase the odds that it will provide sufficient time for the message exchange of the request message 108 and the response message 120.

Thus, FIG. 1 illustrates a system and techniques for improving a messaging operation(s) of the middleware component 104 during communications with the intermittently-available node 106. Of course, FIG. 1 is merely an example, and other implementations are possible. For example, the various elements 130-148 of the response time estimator 128 may be constructed or distributed differently than is illustrated in FIG. 1, while still performing the same or similar functions. Similarly, elements illustrated in the back-end application 102 may be implemented in whole or in part in the middleware component 104, and, conversely, some or all of the elements of the middleware component 104 may be implemented in conjunction with the back-end application 102. For example, the latency notifier 152 may be implemented in the response time estimator 128 or otherwise in the middleware component 104. Further, although the discussion of FIG. 1 has primarily been with respect to wireless transmissions, it will be appreciated that the node 106 may experience intermittent wired connections, as well, such as when the node 106 is intermittently plugged into an Ethernet network, or when the node 106 is associated with a car or other vehicle that is intermittently plugged into a charging station. Many other additional and alternative examples and variations are contemplated, as well.

Figure 2:
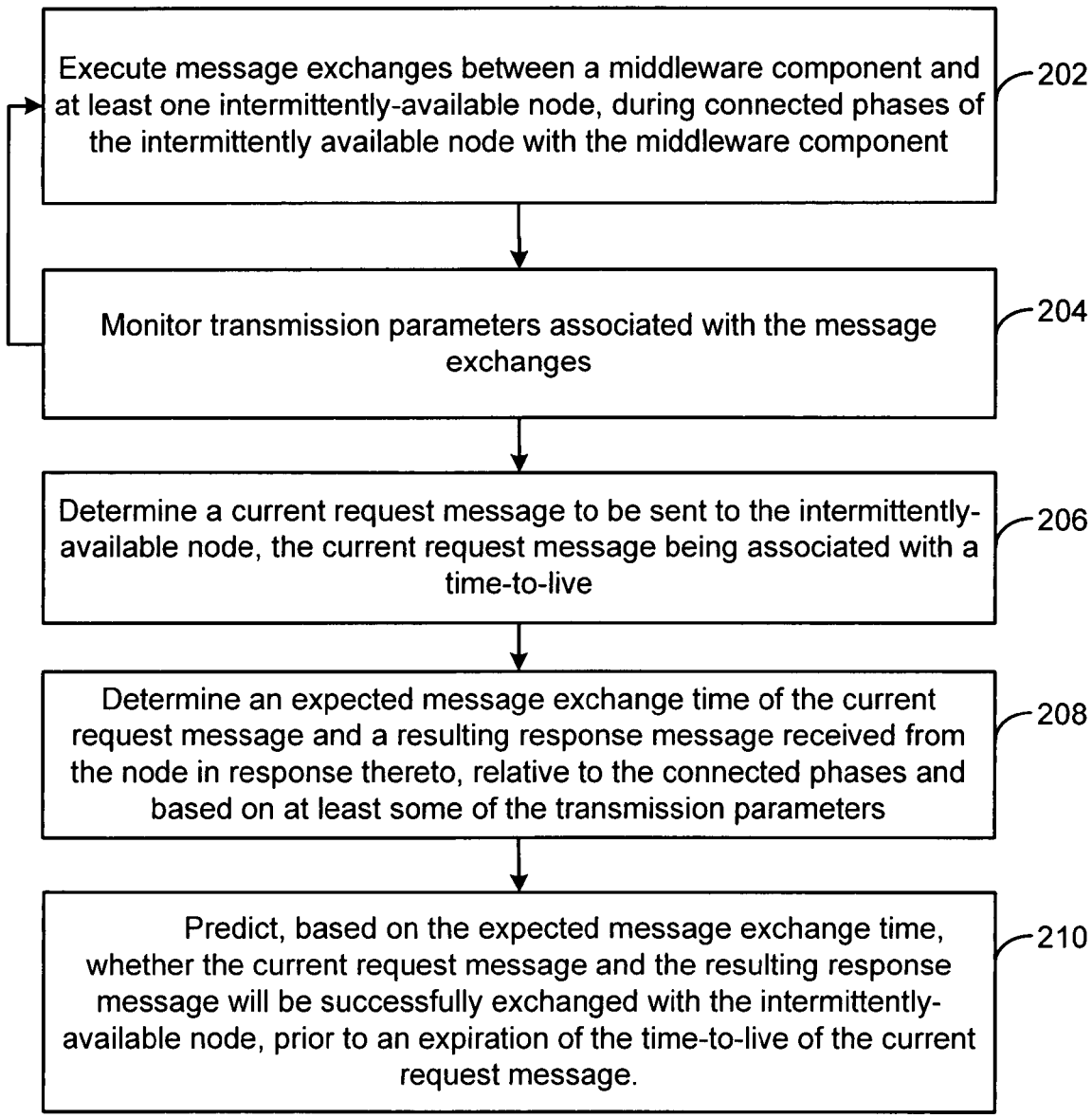
FIG. 2 is a flowchart illustrating examples of operations of the system of FIG. 1.

FIG. 2 is a flowchart 200 illustrating examples of operations of the system 100 of FIG. 1. Although the flowchart 200 is illustrated largely as a sequence of operations with one or more internal loops or iterations, it will be appreciated that the flowchart 200 does not limit the illustrated operations to the order shown.

In the example of FIG. 2, message exchanges may be executed between a middleware component and at least one intermittently-available node, during connected phases of the intermittently available node with the middleware component (202). For example, the middleware component 104 may execute message exchanges with the node 106, during connected phases of the node 106 therewith. Such connected phases (and corresponding non-connected phases) are described above, and are described and illustrated further, below, with respect to FIG. 3A.

For example, when an operation of the system 100 is initiated, the back-end application 102, e.g., the packet generator 150, may begin generating request messages with corresponding times-to-live. These request messages may be placed into the queue 122, forwarded in turn to the message handler 124, and ultimately sent to the desired destination using the transceiver 126. These initial operations may continue without intervention by the response time estimator 128.

During such operations, however, transmission parameters associated with the message exchanges may be monitored (204). For example, the parameter monitor 130 may monitor transmission parameters associated with an availability of the node 106, a size of the messages being exchanges, and a response time associated with each pair of messages in each message exchange. As described, in some example implementations, some or all of these transmission parameters may be averaged, and the results may be stored for later access.

In such implementations, then, there may be some initial operation of the middleware component 104, during which the parameter monitor 130 determines some defined, minimum number of samples, or minimum amount of time, that is judged sufficient for the resulting, averaged parameter(s) to be considered to be significant or reliable. As shown in FIG. 2, the monitoring of transmission parameters and the executing of message exchanges may occur continuously, whether the expectation manager 132 or the result predictor 134 are currently operating or not (such as in the example just mentioned, where the expectation manager 132 and the result predictor 134 may not initially have sufficient data available to reliably execute their respective functions).

A current request message to be sent to the intermittently-available node may be determined, the current request message being associated with a time-to-live (206). For example, the current request message 108 may be determined to be the first request message that is queued following an activation of the expectation manager 132 and the result predictor 134, or, of course, the current request message 108 may simply represent a current request message received during normal, ongoing operations of the response time estimator 128. In either case, and as shown in FIG. 1, the current request message 108 may be determined to be within the queue 122 (e.g., to have been just inserted within the queue 122 by the packet generator 150 of the back-end application 102), and, as shown, the current request message 108 may be associated with the time-to-live 110. It will be appreciated that, due to previous operations of the middleware component 104 (such as those just described during an initial phase in which the parameter monitor 130 monitors the various transmission parameters, without the expectation manager 132 or the result predictor 134 necessarily being in operation), the queue 122 may be partially full of previously-queued request messages.

An expected message exchange time of the current request message and a resulting response message received from the node in response thereto may be determined, relative to the connected phases and based on at least some of the transmission parameters (208). For example, the expectation manager 132 (e.g., the request analyzer 142 and the response analyzer 144) may use the transmission parameters from the parameter monitor 130 to determine an amount of time that the current request message 108 will take to be transferred to the node 106, taking into account, as needed, a number and size of request messages that precede the current request message in the queue 122 (as provided by the queue analyzer 146), as well as the bitrate of communications between the middleware component 104 and the node 106. Similarly, the response analyzer 144 may determine an average time that will be required for transmission of the resulting response message 120, based, for example, on the number and size of request messages preceding the request message 108 in the queue, as well as on the bitrate of the communications channel, and on an expected size of corresponding response messages.

Based on the expected message exchange time, it may be predicted as to whether the current request message and the resulting response message will be successfully exchanged with the intermittently-available node, prior to an expiration of the time-to-live of the current request message (210). For example, the result predictor 134 may predict that the current request message 108 and the resulting response message 120 will not be successfully exchanged before an expiration of the time-to-live 110. In such examples, this prediction may allow removal of the current request message from the queue 122, well before the time-to-live 110 actually expires. Further, as described above, additional steps may be taken to further optimize future operations of the system 100, such as when the TTL optimizer 156 increases the time-to-live 110 for a future transmission of the request message 108, or when the scheduler 154 re-schedules the request message 154 for re-transmission during a time when the queue 122 will be less full, and/or during longer connected phases of the node 106 with the middleware component 104. In other examples, it may occur that the time-to-live 110 provides more than sufficient time for delivery of the request message 108 and receipt of the response message 120. In some cases, therefore, the TTL optimizer 156 also may be configured to reduce the time-to-live 110 for future messages, so as not to delay messages within the queue 122 unnecessarily.

Figure 3A:
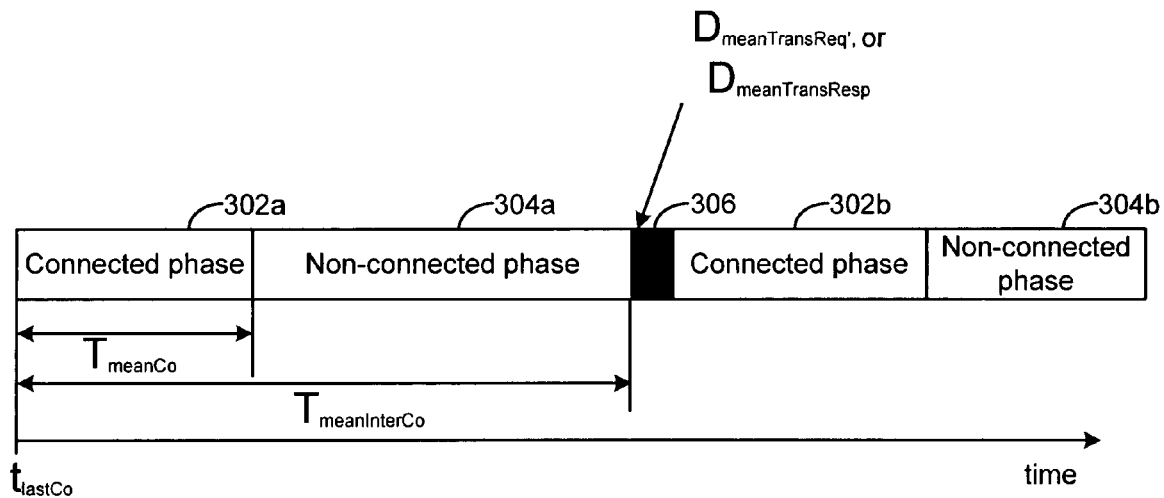
FIGS. 3A-3B are timing diagrams illustrating definitions of transmission parameters used by the system of FIG. 1.
Figure 3B:
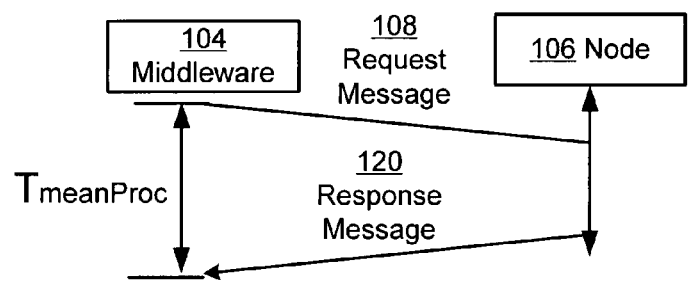

FIGS. 3A-3B are block diagrams illustrating definitions of transmission parameters that may be used by the system of FIG. 1. More specifically, FIGS. 3A and 3B provide illustrations and naming conventions for several of the transmission parameters referenced above as being monitored by the parameter monitor 130.

For example, FIG. 3A illustrates a connected phase 302a, followed by a non-connected phase 304a, followed by a connected phase 302b, followed by a non-connected phase 304b. In FIG. 3A, a point in time when the last connected phase began is illustrated as $t_{lastCo}$, which thus allows for calculation of a difference in time between this point of time when the last connected phase started and a current point of time "now," when required. A time between connected phases is illustrated as $T_{meanInterCo}$, which contains information about the mean time that elapses between the start of two consecutive connected phases, e.g., 302a and 302b. Also in FIG. 3A, a duration of a connected phase(s) is illustrated as $T_{meanCo}$, which contains the mean duration of the connected phase(s) 302a, 302b. It will be appreciated that these values are related to an availability (or connectivity) of the node 106, and may be monitored by the availability monitor 136.

Meanwhile, a mean amount of data per request $D_{meanTransReq}$, which may be measured in bits, refers to an amount of data that may be carried by the request message(s) forwarded by the back-end application 102 to the middleware component 104. In the example of FIG. 3A, the variable $D_{meanTransReq}$ contains the mean amount of a sample of transmitted requests. Similarly, a mean amount of data per response message may be measured in bits and expressed as $D_{meanTransResp}$ (measured in bits). Again, the mean size of the responses may be determined and stored in this variable, e.g., by the data size monitor 138. In FIG. 3A, then, the block 306 illustrates a portion of the connected phase 302b that is taken up or occupied by either a request message or a response message.

FIG. 3B illustrates a processing time that may be determined by the processing time monitor 140 of FIG. 1. For example, the variable $T_{meanResp}$ may contain the mean time between the transmission of request messages, such as the request message 108, to the node 106, and the reception of a response message, such as the response message 120, at the middleware component 104. Thus, the processing time may be used to give an idea about a processing time required for each message exchange. It will be appreciated that since the operations of the response time estimator 128 may be on-going, it may occur that information about the request message 108 and the response message 120 may be used as samples monitored by the parameter monitor 130 for future message exchanges, even as the expectation manager 132 and the result predictor 134 are determining expectations and predictions related to the messages 108, 120.

Thus, FIGS. 3A and 3B conceptually illustrate examples of some of the concepts described herein. In particular, FIGS. 3A and 3B illustrate specifically named and defined variables that may be obtained by the parameter monitor 130 and that may be used by the expectation manager 132, to calculate various expected parameters, for use by the result predictor 134.

Figure 4A:
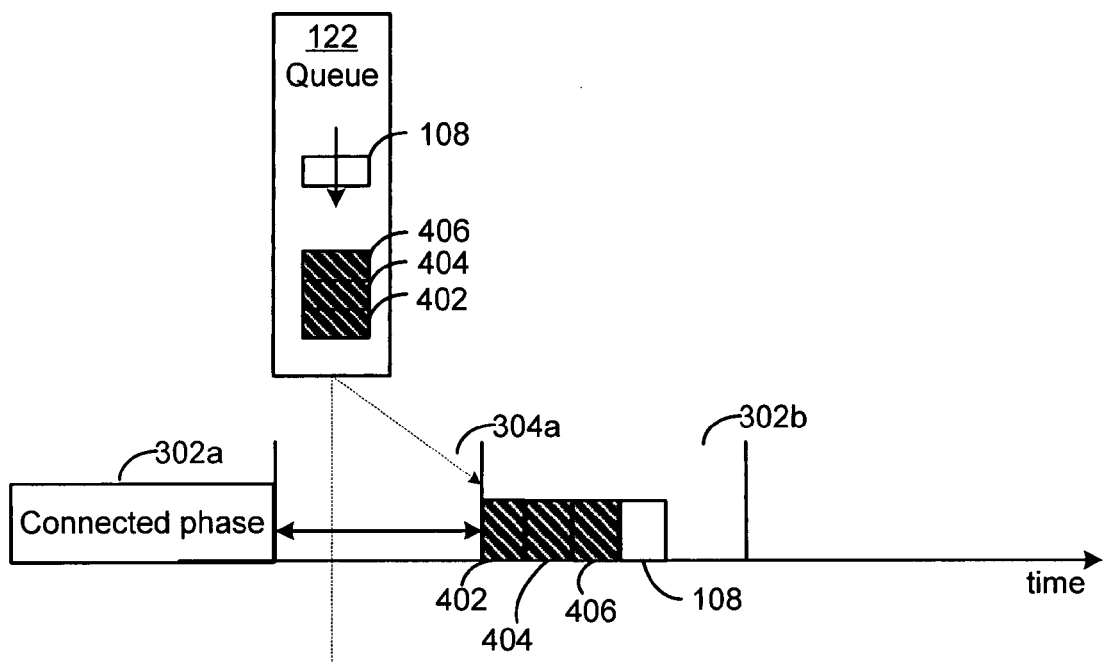
FIGS. 4A and 4B are timing diagrams illustrating example response time estimation results using the system of FIG. 1.
Figure 4B:
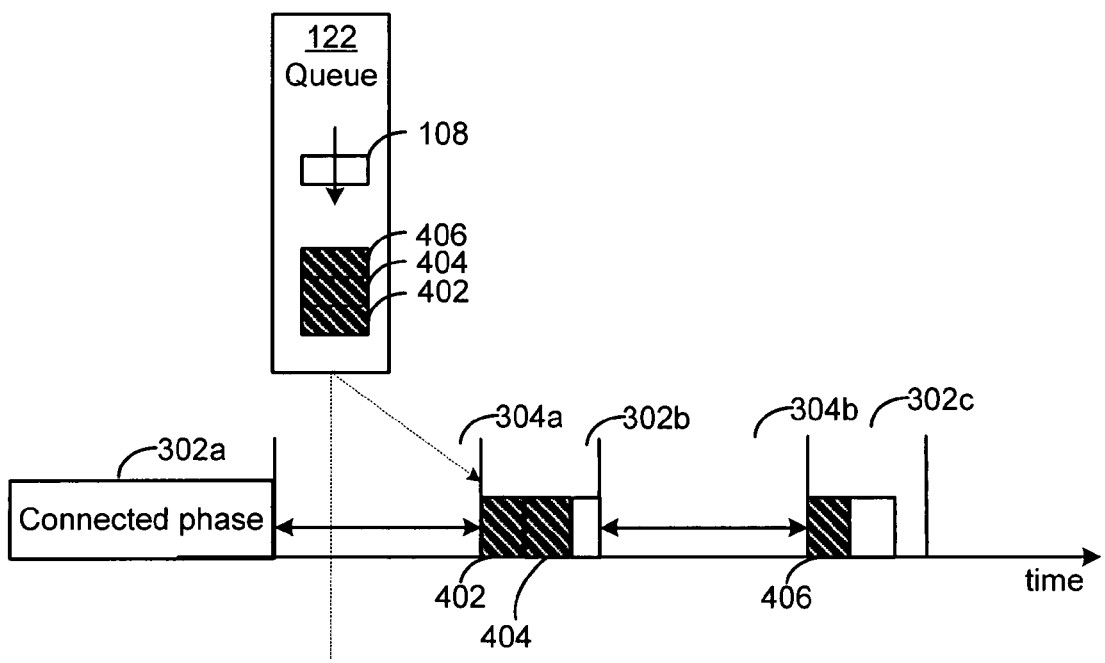

FIGS. 4A and 4B are timing diagrams illustrating example response time estimation results using the system of FIG. 1. In FIG. 4A, the connected phase 302a has ended, and the second, subsequent connected phase 302b begins. Sometime in the interim non-connected base 304a, it may occur that the queue 122 contains request messages 402, 404, 406 that were left over as being untransmitted during the connected phase 302a (i.e., the connected phase 302a was not long enough to permit transmission of request messages 402, 404, 406. Thus, the request messages 402, 404, 406 wait in the queue 122 for the next connected phase 302b, when the current or new request message 108 is added to the queue 122 (in association with its time-to-live 110, not shown in FIG. 4A).

At this point in time, the response time estimator 128, as described herein, may act immediately (e.g., well before an end of the time-to-live 110) to determine whether and when the current request message 108 will be sent to the node 106 in exchange for the response message 120, and, consequently, there is no need for the current request message 108 to be held in the queue 122 for the entirety of the time-to-live 110. For example, as shown, the response time estimator 128 may determine that the request messages 402, 404, 406 will be sent in the next connected phase 302b, followed by the request message 108. Then, for example, if the response time estimator 128 estimates or predicts that the time-to-live 110 of the request message 108 will expire at approximately a time that the request message 406 is delivered, then it may be recognized that the request message 108 will not be delivered in any case, and so the request message 108 may be removed from the queue 122 immediately, e.g., even before a beginning of the connected phase 302b. On the other hand, for example, if the response time estimator 128 determines that the time-to-live 110 will expire sometime well after the end of the connected phase 302b, then the request message 108 may simply be left in the queue 122 for delivery in the normal course.

Figure 5:
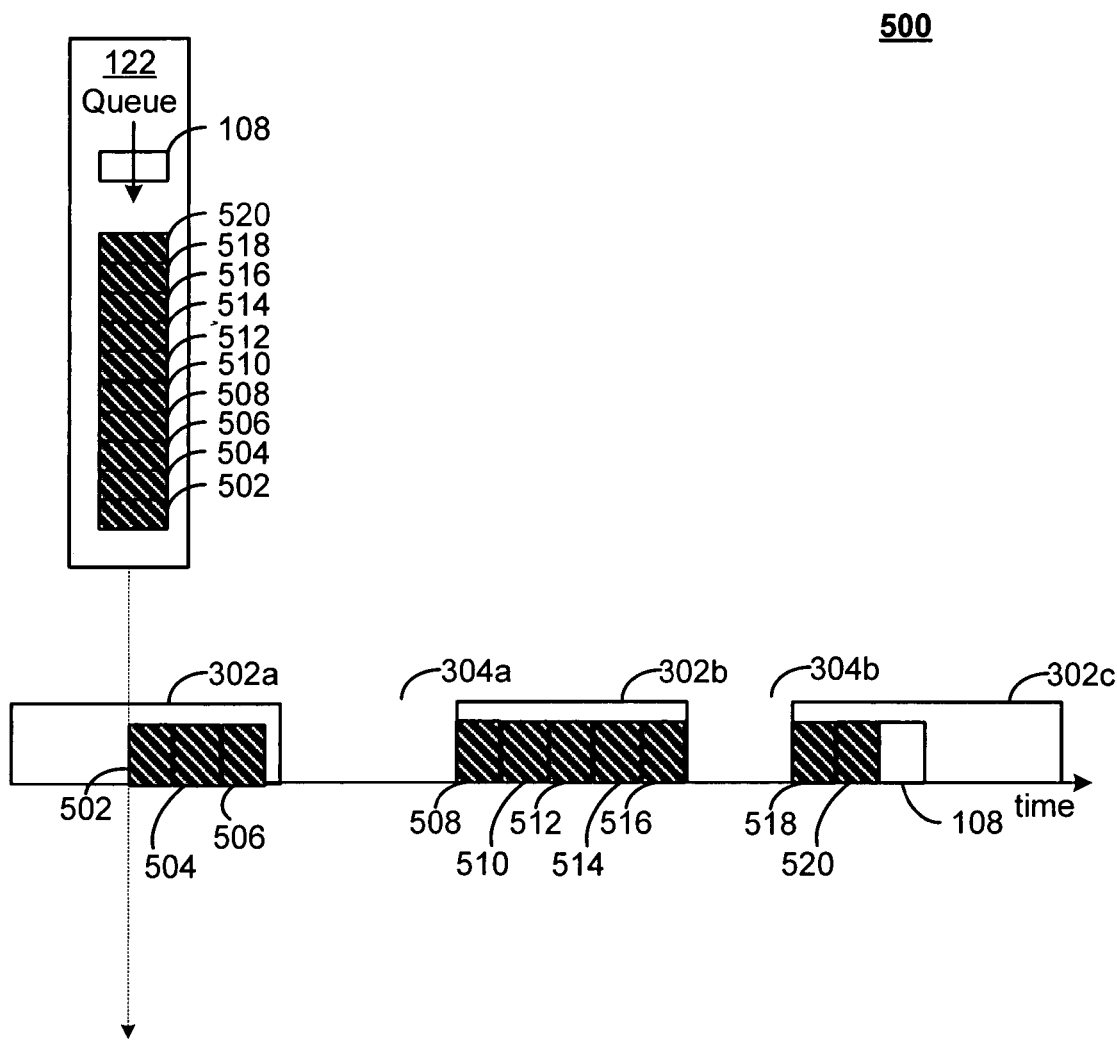
FIG. 5 is another timing diagram illustrating example response time estimation results using the system of FIG. 1.

In the example of FIG. 4A, it is assumed for ease of illustration and understanding that the response time estimator 128 is only predicting results for the next connected phase 302b (which may be a current connected phase if the request message 108 were to be placed into the queue 122 after a beginning of the connected phase 302b, as shown with respect to FIG. 5). In FIG. 4B, it is illustrated that the response time estimator 128 may predict results for connected phases beyond a current or next-consecutive connected phase.

As shown, for example, if may occur that the connected phase 302b is relative short in duration, so that only the messages 402 and 404 may be delivered therein. Then, the message 406 and the current request message 108 may be delivered in a following connected phase 302c, as shown. In this case, it will be appreciated that the response time estimator 128 also takes into consideration information regarding the intervening non-connected phase(s) 304b in determining whether the current request message 108 may be delivered before expiration of its time-to-live 110.

FIG. 5 is another timing diagram illustrating example response time estimation results using the system of FIG. 1. In FIG. 5, request messages 502-520 are in the queue 122, and the connected phase 302a is currently active, when the current request message 108 is added. Then, the response time estimator 128 may determine that the current request message 108 will not be delivered before an end of the current connected phase 302a, while the next connected phase 302b will be filled by transmission of the request messages 508-516. Thus, in the example, the current request message 108 may be predicted to be delivered during the following connected phase 302c, as shown.

As a result, for example, if the time-to-live 110 of the request message 108 is less than a time at which the message 520 will be delivered, then, again, the response time estimator 128 may know very quickly that the request message 108 will not be delivered with the current time-to-live 110 in effect, and so should be removed immediately from the queue 122, before, e.g., and end of the current connected phase 302a.

FIGS. 4A, 4B, and 5 illustrate simple examples for the sake of clarity and understanding. It will be appreciated that the response time estimator 128 is capable of handling greater complexity in predicting a response time of request messages from the middleware component 104. For example, the response time estimator 128 may take into account both the request and the response messages that are part of a message exchange with the node 106, using, for example, the information described below with respect to FIGS. 6 and 7.

Figure 6:
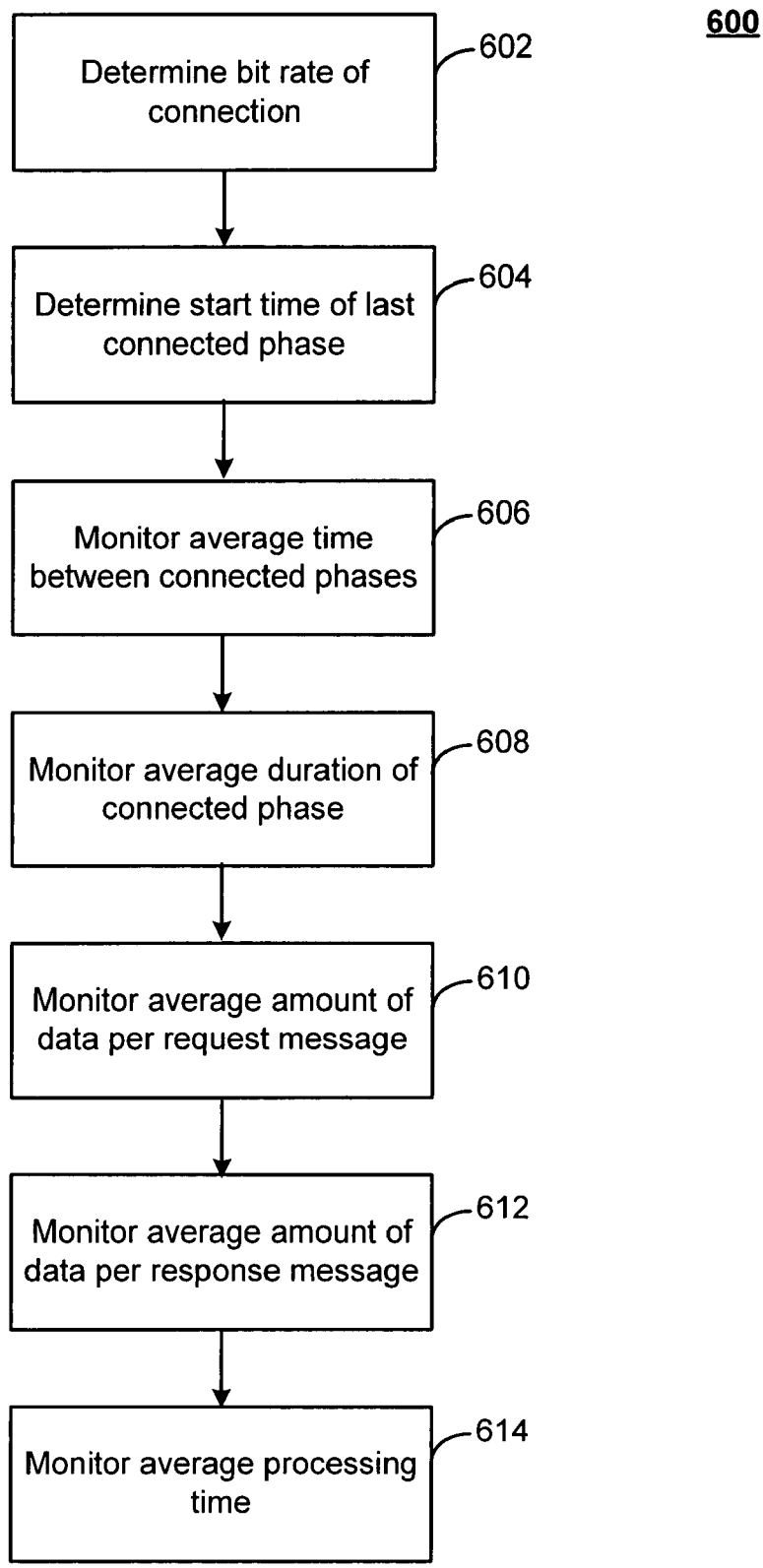
FIG. 6 is a second flowchart illustrating examples of operations of the system of FIG. 1.

FIG. 6 is a second flowchart 600 illustrating examples of operations of the system of FIG. 1. More specifically, FIG. 6 illustrates operations that may be performed by, or in association with, the parameter monitor 130, in order to obtain or provide information that may be used by the expectation manager 132 to determine expected transmission times for the current request message 108 (and resulting response message 120).

In the example of FIG. 6, a bit rate of the connection between the middleware component 104 and the node 106 may be determined (602). As referenced above, this value may be known at design time for the system 100, and may be assumed in some scenarios to be substantially stable or constant. In other scenarios, the bit rate may be determined at run-time, e.g. by the parameter monitor 130.

Then, a start time of the last connected phase may be monitored and determined (604). This time is illustrated as $t_{lastCo}$ in FIG. 3A, and, as referenced above, refers to the point of time when the last connected phase started. A time between connected phases, illustrated as $T_{meanInterCo}$ in FIG. 3A, may be monitored (606), which references information about the mean time that elapses between the start of two consecutive connected phases. A duration of connected phases may be determined (608), illustrated as $T_{meanCo}$ in FIG. 3A, which refers to the mean duration of the connected phase when the connection from the middleware component 104 to the node 106 is available. For example, the availability monitor 136 of the parameter monitor 130 FIG. 1 may be configured to measure and/or calculate the above-referenced parameters, or similar parameters.

Also, a mean amount of data per request $D_{meanTransReq}$, which may be measured in bits and which is illustrated in FIG. 3A as block 306, may be determined (610). That is, as described above, each request message transports a certain amount of data, and the variable $D_{meanTransReq}$ contains the mean amount of all transmitted request messages that have been monitored so far. Similarly, a mean amount of data per response $D_{meanTransResp}$, also measured in bits and illustrated conceptually in FIG. 3A as the block 306, references the mean size of the response messages. For example, the data size monitor 136 of the parameter monitor 130 FIG. 1 may be configured to measure and/or calculate the above-referenced parameters, or similar parameters.

Finally in the example of FIG. 6, a mean processing time $T_{meanProc}$ may be determined (614), which is illustrated in FIG. 3B. That is, as referenced there, it is expected that each request message should be answered by a response message from the node 106. Thus, the variable $T_{meanProc}$ contains the mean time between the transmission of the request message to the node, and the reception of the response message at the middleware component 104 (and thus, gives an idea about the processing time required for each request message). For example, the processing time monitor 140 of the parameter monitor 130 FIG. 1 may be configured to measure and/or calculate the above-referenced parameter $T_{meanProc}$, or similar parameters.

As referenced above, these variables may not be known at the beginning of operation of the system 100. Therefore, as described, they may be monitored during runtime of the system 100. Then, statistics may be maintained for each of the variables, as also described, so as to be able to estimate the mean values of these variables. After some suitable number of measured values, e.g., at least 50 measured values, the mean value(s) is/are usable.

Figure 7:
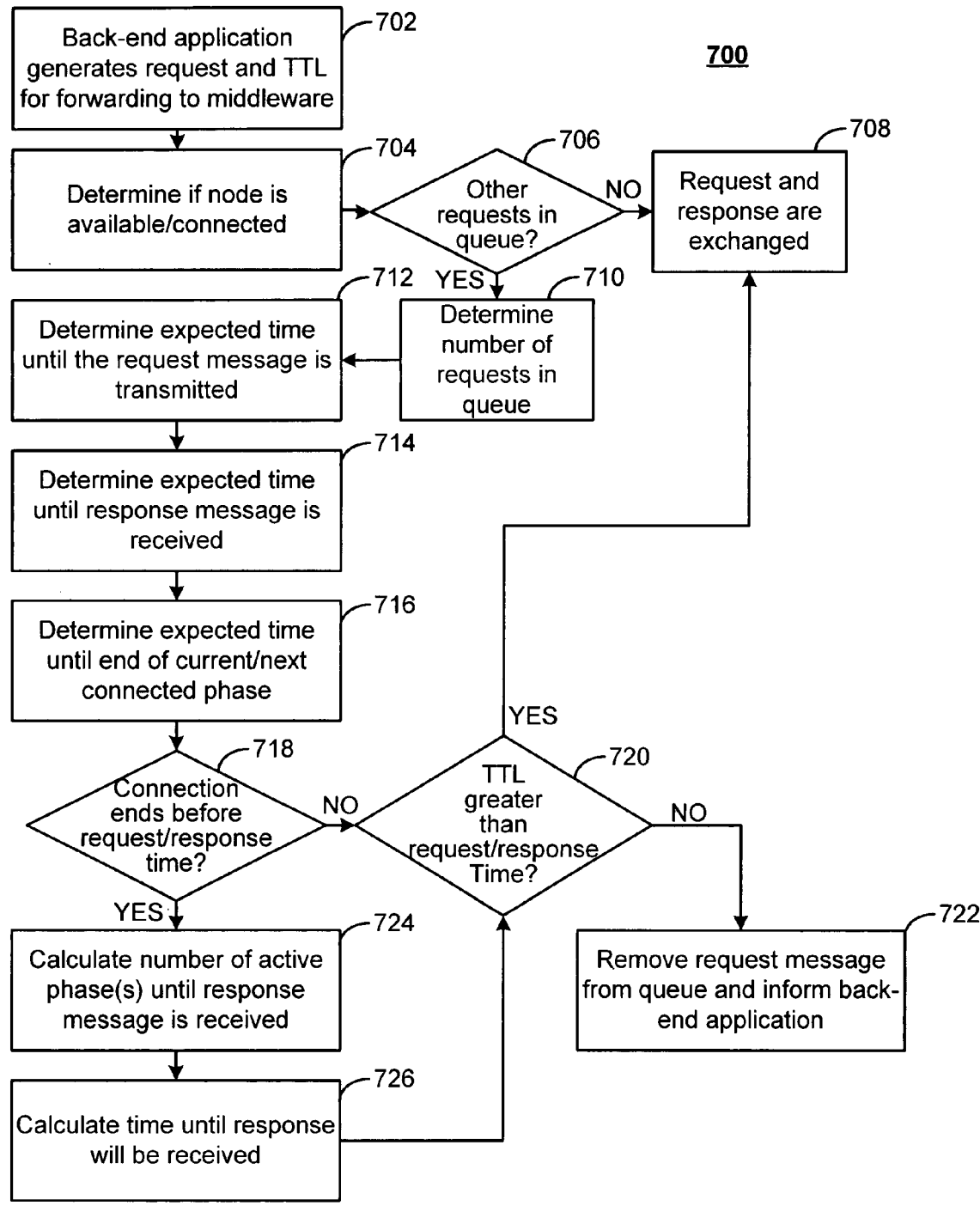
FIG. 7 is a third flowchart illustrating examples of operations of the system of FIG. 1.

FIG. 7 is a third flowchart 700 illustrating examples of operations of the system of FIG. 1. FIG. 7 generally illustrates that, with the acquired variables resulting from the operations of the flowchart 600 of FIG. 6, the expected request transmission time(s) and the corresponding response time(s) can be estimated, so that a success or failure of a transmission of the request message 108 (and the resulting response message 120) prior to the time-to-live 110 may be predicted.

In FIG. 7, it may be assumed, for example, that the processes of FIG. 6 have been occurring, and may be ongoing during the operations of the flowchart 700. That is, the queue 122, the message handler 124, and the transceiver 126 may be actively transmitting and receiving request messages and response messages between the back-end application 102 and the node 106, while such actions are monitored by the parameter monitor 130 in accordance with the description of FIG. 6 just given. At some point, e.g., when a statistically-significant number of samples have been collected, the expectation manager 132 and the result predictor 134 may be engaged for operation relating to a next/current request message, such as the request message 108 of FIG. 1.

Thus, in FIG. 7, the back-end application 102 may generate the current request 108 and the time-to-live 110 for forwarding to the middleware component 104 (702), e.g., to the queue 122. At this point, an initial determination may be made as to whether the node 106 is currently connected (704), e.g., by the connection analyzer 148 or the availability monitor 136. In this regard, it will be appreciated that certain ones of the operations/calculations described below may vary based on whether the node 106 is currently non-connected when the current request message 108 is placed into the queue 122 (e.g., is in the non-connected phase 304a, as shown in the examples of FIGS. 4A and 4B), or whether the node 106 is currently connected when the current request message 108 is placed into the queue 122 (e.g., is in the connected phase 302a, as shown in the example of FIG. 5)

Further in FIG. 7, the notation is used that relates the time-to-live 110 with a current time frame, by defining a time $t_{due}$ at which time the response message 120 is due in response to the request message 108, where:

$$t_{due} = t_{now} + TTL \qquad \text{Eq. (1)}$$

If the current request message arrives at the queue 122, as in FIGS. 4A, 4B, or 5, or similar, but with the difference that there are no other request messages in the queue 122 (706), then it may be assumed in the example of FIG. 7 that the request message 108 may be delivered and the resulting response message 120 will be received (708). That is, it may be assumed that either the node 106 is currently connected and the message exchange proceeds right away, or that the time-to-live 110 was selected to account at least for a single non-connected phase and/or a single request/response message exchange, so that the message exchange may occur as soon as the next connected phase begins. In other examples, such an assumption may not hold, e.g., it may occur that a non-connected phase, or a time between a request message and a response message (e.g., due to a slow response time of the node 106) may be long enough to last longer than the time-to-live, in which case the present calculations/operations may be accommodated to account for such situations (e.g., the lengthy non-connected phase may be estimated and accounted for, and/or the slow response time of the node 106 may be accounted for as part of the processing time $T_{meanProc}$).

Otherwise, if there are preceding request messages in the queue 122 (706), then the queue analyzer 146 may determine the number of such preceding messages (710). Then, an expected time $t_{trans}$ until the request message 108 is transmitted may be determined (712), using, for example, Eq. (2):

$$t_{trans}=(n_{before}+1)(BRate)(D_{meanTransReq}) \quad \text{Eq. (2)}$$

In Eq. (2), the variable $n_{before}$ denotes the number of messages that are in the queue 122 before the current/new request message 108. In the example of FIGS. 6 and 7, an advantage is that the mean values are used for the calculation(s), which reduces or eliminates a need to determine the size of each particular request message in the queue 122 that is ahead of the current request message 108. For example, the request analyzer 142 may be used to determine the values $t_{trans}$, using the appropriate parameter values as described with respect to FIG. 6.

Then, the expected time required for the transmission of all response messages, including the resulting response message 120 corresponding to the request message 108, may be estimated using Eq. (3):

$$t_{resp}=(n_{before}+1)(BRate)(D_{meanTransResp}) \quad \text{Eq. (3)}$$

Thus, similarly to Eq. (2), the response time may be determined based on a number of preceding request messages, the relevant bitrate, and a mean data size of the response messages. For example, the response analyzer 144 may be used to determine the values $t_{resp}$, using the appropriate parameter values as described with respect to FIG. 6.

An expected time until an end of a current or next connected phase may then be determined (716). For example, in a first scenario in which the node 106 is currently connected, as in FIG. 5, a time when the current connected phase will end or abort may be calculated using Eq. (4a):

$$t_{abort}=t_{lastCo}+T_{meanCo} \quad \text{Eq. (4a)}$$

However, in other examples, such as in FIGS. 4A and 4B, in which the node 106 is not currently connected when the current request message 108 arrives, then the time $t_{abort}$ until an end of the next connected phase may be computed as in Eq. (4b):

$$t_{abort}=t_{lastCo}+T_{meanInterCo}+T_{meanCo} \quad \text{Eq. (4b)}$$

In either case, it may be expected that the requests and all corresponding responses may be transmitted during the current (or next) connected phase if Eq. (5) holds true:

$$t_{abort} > (t_{now}+t_{trans}+t_{resp}) \quad \text{Eq. (5)}$$

That is, if the (current or next) connection does not end/abort before the request/response time $t_{trans}+t_{resp}$, relative to the current time $t_{now}$ (718), then as long as the time-to-live 110 is also longer from $t_{now}$ than the request/response time of $t_{trans}+t_{resp}$ (720), so that Eq. (6), below, is false, then the request message 108 and the response message 120 may be exchanged (708).

However, if the request/response time $t_{trans}+t_{resp}$ is greater than the time-to-live 110 from time $t_{now}$, so that Eq. (6) is true:

$$t_{due} > (t_{now}+t_{trans}+t_{resp}). \quad \text{Eq. (6)}$$

then it may be determined that the current request message 108 should be removed from the queue 122, and the back-end application 102 should be informed of the removal (722), so that appropriate action may be taken, as described herein.

Meanwhile, if Eq. (5) is false, resulting in true condition in Eq. (7):

$$t_{abort} < (t_{now}+t_{trans}+t_{resp}) \quad \text{Eq. (7)}$$

then the implication is that the response message 120 may not be expected during the current (or next) connected phase.

Therefore, a number of following connected phases until the request message can be answered with a response message may be determined.

For example, the number of expected connected phases until the response message is received may be determined (724) using Eq. (8a):

$$n_{expConn}=((t_{trans}+t_{resp})-(T_{meanCo}-(t_{now}-t_{lastCo})))/T_{meanCo} \quad \text{Eq. (8a)}$$

With Eq. (8a), the entire time expected for transmission is divided by the average time available during one connected phase, as shown.

If the node 106 is currently in a non-connected phase, then the number of expected connected phases until the response message is received may be determined (724) using Eq. (8b)

$$n_{expConn}=(t_{trans}-t_{resp})/T_{meanCo} \quad \text{Eq. (8b)}$$

Eqs. (8a) and (8b) also enable an estimation of the time when the response message may be expected (726), in either of the two scenarios, using, e.g., Eq. (9):

$$t_{expConnResp}=t_{lastCo}+(\text{floor}(n_{expConn})+1)(T_{meanInterCo})+(n_{expConn}-\text{floor}(n_{expConn}))(T_{meanCo}). \quad \text{Eq. (9)}$$

in which the floor( )-operation has been applied to round to the next lower integer value to get a number for the connected phase(s). Also in Eq. (9), the last term serves to add the remaining time (after the division) to a beginning of the expected connected phase.

The value $t_{expConnResp}$ may then be compared to the expiration time of the time-to-live 110 (720). Thus if Eq. (10) is true:

$$t_{due} > t_{expConnResp}+(f_{sec})(t_{trans}+t_{resp}) \quad \text{Eq. (10a)}$$

Then it may be assumed that the response message arrives before the time-to-live 110 expires (708). Otherwise (722), the response message may be expected not to arrive early enough, so that the request message 108 may be removed from the queue 122 and the back-end application 102 may be notified.

Many variations are contemplated. For example, in comparing the time-to-live 110 to the expected request/response time, a security factor may be applied. For example, it may be checked if the expiration of the time-to-live ($t_{due}$) and the expected request/response time is too close. Such a security factor $f_{sec}$ would serve to change Eq. (10a) to Eq. (10b):

$$t_{due} > (t_{now}+t_{trans}+t_{resp}+(f_{sec})(t_{due}-t_{now})). \quad \text{Eq. (10b)}$$

Eq. (10b) thus contemplates minor deviations between actual transmission times compared to the estimated times, to account for inaccuracies or unexpectedly long or short connected or non-connected phases. For example, $f_{sec}$ may be in a range between 0.2 to 0.05, meaning that a deviation from the expected times of 5-20% is contemplated.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a-read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A response time estimator system, the system comprising:
   a parameter monitor configured to monitor transmission parameters associated with message exchanges between a middleware component and at least one intermittently-available node, the intermittently-available node experiencing connected phases and non-connected phases with the middleware component;
   an expectation manager configured to determine a current request message at a queue of the middleware component, and configured to determine an expected message exchange time for the current request message and a resulting response message, based on a number of preceding request messages within the queue and on corresponding response messages from the intermittently-available node, and based on at least some of the transmission parameters; and
   a result predictor configured to perform a comparison of the expected message exchange time and a time-to-live of the current request message, and configured to predict, based on the comparison, whether a receipt of the resulting response message will occur, within one of the connected phases and before expiration of the time-to-live.

2. The system of claim 1 wherein the parameter monitor includes an availability monitor that is configured to monitor characteristics of the connected phases of the intermittently-available node.

3. The system of claim 1 wherein the parameter monitor includes a data size monitor that is configured to monitor data sizes of the preceding request messages and the corresponding response messages.

4. The system of claim 1 wherein the parameter monitor includes a processing time monitor that is configured to determine a processing time associated with transmission of each of the request messages and corresponding receipt of each of the corresponding response messages.

5. The system of claim 1 wherein the intermittently-available node is associated with a moving or movable object.

6. The system of claim 1 wherein the intermittently-available node experiences the non-connected phases during a power save operation of the intermittently-available node.

7. The system of claim 1 wherein the expectation manager is configured to determine an expected time of transmission of the current request message and the preceding request messages, and further configured to determine an expected time of transmission of the resulting response message and the corresponding response messages.

8. The system of claim 1 wherein the result predictor is configured to identify a specific one of the connected phases in which the resulting response message would be received.

9. The system of claim 1 wherein the result predictor is configured to make a determination that the resulting response message will not be received prior to an end of the time-to-live.

10. The system of claim 9 wherein at least one action is taken in response to the determination that the resulting response message will not be received prior to the end of the time-to-live, the at least one action including removal of the current request message from the queue, increasing of the time-to-live, re-scheduling of the transmission of the current request message, or outputting of a notification of increased latency.

11. A computer-implemented method for causing at least one processor to execute instructions stored on a non-transitory computer readable storage medium, the method comprising:

executing message exchanges between a middleware component and at least one intermittently-available node, during connected phases of the intermittently available node with the middleware component;

monitoring transmission parameters associated with the message exchanges;

determining a current request message in a queue of the middleware component to be sent to the intermittently-available node, the current request message being associated with a time-to-live;

determining an expected message exchange time of the current request message and a resulting response message received from the intermittently available node in response thereto, relative to the connected phases and based on a number of preceding request messages within the queue and on corresponding response messages from the intermittently available node, and based on at least some of the transmission parameters; and predicting, based on a comparison of the expected message exchange time and the time-to-live of the current request message, whether the current request message and the resulting response message will be successfully exchanged with the intermittently-available node, during one of the connected phases and prior to an expiration of the time-to-live of the current request message.

12. The method of claim 11 wherein monitoring transmission parameters associated with the message exchanges comprises:

monitoring one or more of availability parameters associated with characteristics of the connected phases of the intermittently-available node, data sizes of messages in the message exchanges, and processing times of pairs of the message exchanges.

13. The method of claim 11 wherein determining the expected message exchange time of the current request message and the resulting response message received from the intermittently available node in response thereto, relative to the connected phases and based on at least some of the transmission parameters, comprises:

determining a connected phase of the connected phases in which the resulting response message is expected to be received.

14. The method of claim 11 wherein predicting, based on the expected message exchange time, whether the current request message and the resulting response message will be successfully exchanged with the intermittently-available node, prior to the expiration of the time-to-live of the current request message, comprises:

predicting that the current request message and the resulting response message will not be successfully exchanged with the intermittently-available node, prior to the expiration of the time-to-live.

* * * * *